United States Patent Office 3,270,589
Patented Sept. 6, 1966

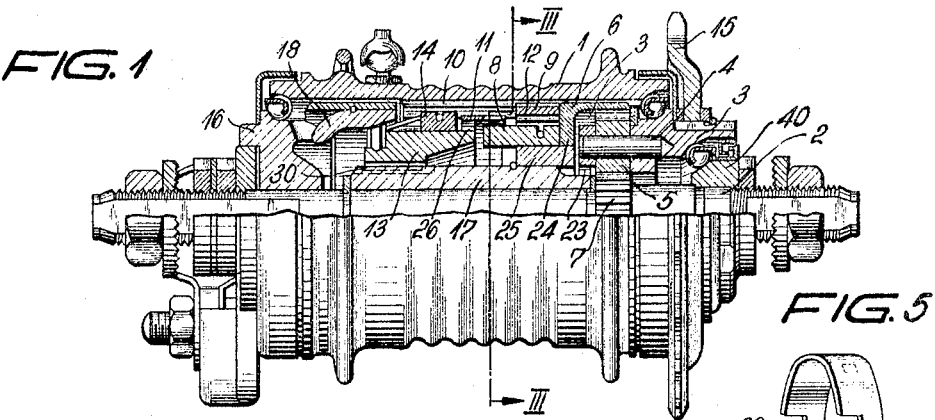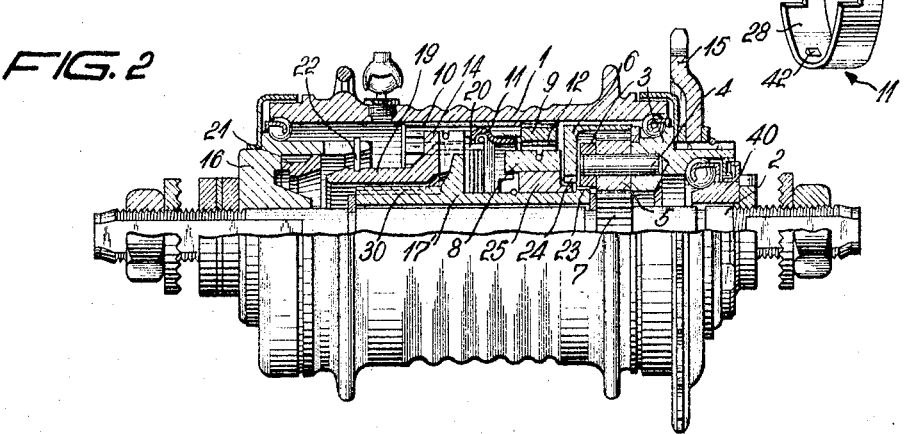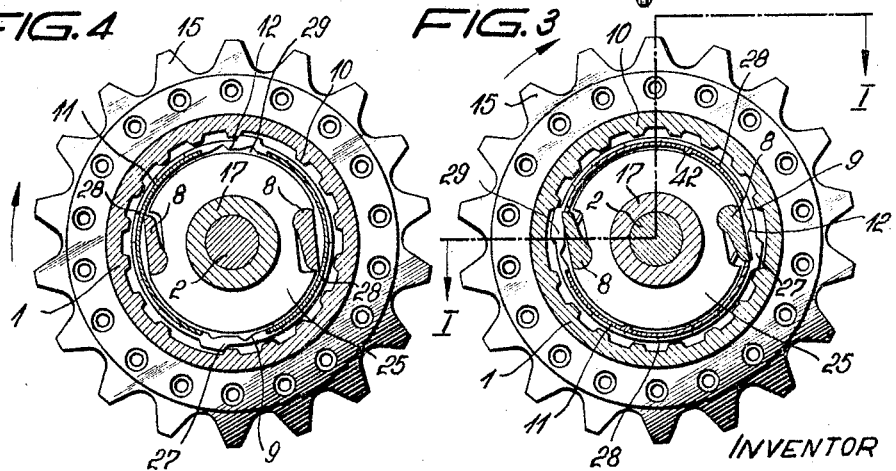

3,270,589
DUAL SPEED HUB WITH AUTOMATIC
SPEED SHIFT
Hans Joachim Schwerdhöfer, Schweinfurt (Main), Germany, assignor to Fichtel & Sachs A.G., Schweinfurt (Main), Germany, a corporation of Germany
Filed Apr. 16, 1963, Ser. No. 273,329
Claims priority, application Germany, Apr. 19, 1962, F 36,604
10 Claims. (Cl. 74—750)

This invention relates to multiple speed hubs for bicycles and like vehicles, and more particularly to a dual speed hub in which the speed or transmission ratio is automatically shifted in response to back pedaling.

The basically known type of bicycle hub with which this invention is concerned has a stationary shaft, a hub shell which is mounted for rotation on the shaft, a driver equipped with a sprocket or the like for receiving power from pedals or a motor, and a planetary gear transmission interposed between the driver and the hub shell for driving the hub shell at one of at least two available speeds relative to the driver.

An object of this invention is the provision of improved speed control means for selectively connecting the hub shell to different elements of the planetary gear transmission which rotate at different speeds.

A more specific object is the provision of speed control means which are structurally simple, therefore capable of being produced at low cost, yet rugged and reliable.

With these and other objects in view, the invention in one of its more specific aspects interposes two ratchet couplings respectively between the hub shell and two members of the multiple speed transmission which are operatively connected for rotation at respective lower and higher speeds. A control member is rotatably mounted on the shaft, and is movable relative to a pawl of the faster moving coupling between a blocking and an unblocking position. In the blocking position the control member holds the pawl of the faster moving coupling out of engagement with the corresponding ratchet. In the unblocking position, the control member permits engagement of the faster moving ratchet coupling. First connecting means are provided to rotate the control member jointly with the pawl when the driver of the hub rotates in a forward direction. Second connecting means connect the control member to the shaft when the driver rotates backward.

The exact nature of this invention as well as other objects and advantages thereof will be readily apparent from consideration of the following specification relating to the annexed drawing in which:

FIG. 1 shows a dual speed bicycle hub of the invention equipped with a coaster brake, the view being in front elevation, and partly in section on the line I—I in FIG. 3;

FIG. 2 shows a bicycle hub similar to that illustrated in FIG. 1 in a corresponding view, the hub of FIG. 2 lacking a coaster brake;

FIG. 3 shows the hub of FIG. 1 in radial section on the line III—III in its high speed position;

FIG. 4 shows the hub of FIG. 1 in section on the line III—III when in its low speed position; and FIG. 5 is a perspective view of a control member common to the hubs of FIGS. 1 and 2.

Referring now to the drawing in detail, and initially to FIG. 1, there is shown a bicycle hub the operating elements of which are supported on a shaft 2 equipped to be fixedly secured in the rear fork of the bicycle frame. A driver 3 is mounted on an axial end of the shaft 2 which will be referred to hereinafter as the drive end, whereas the other end of the shaft 2 will be referred to as the brake end.

A ball bearing including an annular bearing race member 40 is mounted on the drive end of the shaft 2 to rotatably support the driver 3. Another ball bearing including an annular bearing race member 16 is mounted on the brake end of the shaft 2. The shell 1 of the bicycle hub is rotatably mounted on the bearing race member 16 and the driver 3. Its cavity encloses most of the other operating elements of the hub.

A dual speed planetary gear transmission is mounted on the shaft 2 within the hub shell 1. A portion of the driver 3 constitutes the planet carrier of the transmission. Several planet shafts 4 of which only one is seen in the drawing are circumferentially spaced about the axis of the shaft 2 on the driver 3. Planet gears 5 are rotatable on respective planet shafts 4 and simultaneously mesh with a gun gear 7 integral with the stationary shaft 2 and with an enveloping ring gear 6.

A drive sleeve 17 is connected with the driver 3 for joint rotation about the axis of the shaft 2 by means of a claw coupling 23. The claw coupling permits convenient axial engagement of the driver with the sleeve 17 during assembly of the hub. External threads 30 on the sleeve 17 engage corresponding internal threads of a brake member 13. The brake member 13 is yieldably coupled to the shaft 2 by a spring in a known manner more fully described hereinafter in connection with the hub shown in FIG. 2. When the brake member 13 threadedly moves on the sleeve 17 toward the brake end of the hub, a conical face of the brake member axially engages a corresponding face of a slotted brake sleeve 18 secured against rotation by engagement with the bearing race member 16. Engagement of the brake meber 13 with the sleeve 18 radially spreads the latter so that it frictionally engages an internal face of the hub shell 1 and thus retards or arrests rotation of the latter in a manner well known in this art.

The brake member 13 carries two pawls 14 of a first ratchet coupling. The pawls 14 are offset 180° from each other and spring loaded in a conventional manner for engagement with the teeth of a ratchet 10 integral with the hub shell 1. In the position illustrated in FIG. 1, the brake member 13 abuts axially against the end of the threads 30 under the urging of the afore-mentioned coupling spring in such a manner that the brake member 13 rotates with the drive sleeve 17 when the driver 3 is rotated in a forward direction by a releasably attached drive sprocket 15 during normal forward pedaling. The axial threaded movement of the brake member 13 is thus limited between respective positions of abutment against the drive end of the thread 30 and against the brake sleeve 18.

A pawl carrier 25 is rotatably mounted on the drive sleeve 17. The carrier 25 carries the pawls 8 of a second ratchet coupling also seen in FIGS. 3 and 4. The pawl carrier 25 is connected to the ring gear 6 of the transmission by means of a claw coupling 24 for convenience of assembly. In the assembled condition of the hub, the carrier 25 rotates with the ring gear 6 at a higher speed than the normal rotary forward speed of the brake member 13.

The pawls 8 cooperate with an internal ratchet 12 on a coupling ring 9. External radial projections 27 on the coupling ring 9 engage axially elongated teeth of the ratchet 10 which are sufficiently spaced from each other to permit relative rotation of the coupling ring 9 and of the shell 1 through an angle of approximately 15°. The gap between two teeth of the ratchet 10 which permits such movement is limited to an axial portion of the ratchet coextensive with the coupling ring 9. The pawls 8 axially project from the coupling ring 9 toward the brake end of the hub and the member 13.

A control ring 11 shown in detail in FIG. 5 envelops axially adjacent portions of the pawls 8 and of the brake member 13. The control ring 11 has two diametrically opposite axial notches 29 which define therebetween two axially projecting portions 28 of the ring 11. Each projecting portion 28 carries an internal radial projection 42. In the assembled condition of the ring 11, the notches 29, the projecting portions 28, and the radial projections 42 are aligned in a common radial plane with the freely projecting ends of the pawls 8 so that the pawls may enter the notches 29 for engagement with the ratchet 12 (FIG. 3) or be held out of engagement with the ratchet 12 when the free pawl ends abut against internal surfaces of the projecting ring portions 28 (FIG. 4). A spring 26 mounted on the brake member 13 frictionally engages the continuously annular portion of the control ring 11 and thereby yieldably couples the ring to the brake member.

The afore-described apparatus operates as follows:

In the low speed position of the hub, motive power is transmitted from the sprocket 15 to the hub shell 1 by a train of motion transmitting members which includes the driver and planet carrier 3, the claw coupling 23, the drive sleeve 17, the brake member 13, the pawls 14, and the ratchet 10. During low speed operation of the hub, the second ratchet coupling 8, 12, 9, 27, 10 is disengaged by the control ring 11 in a manner which will presently be described.

Power is transmitted from the drive sprocket 15 to the hub shell 1 in the high speed position of the hub by means of the planet carrier 3, the planet gears 5, the ring gear 6, the pawl carrier 25, and the aforementioned second ratchet coupling. The ratchet 10 rotates faster than the pawls 14 in the high speed position of the hub, and the ratchet 10 therefore overruns the pawls 14. If the sound generated thereby is objectionable, known means may be provided for holding the pawls 14 away from the ratchet 10 in the high speed position of the hub.

Back pedaling and the resulting backward rotation of the sprocket 15 cause engagement of the brake sleeve 18 with the hub shell 1. When the sleeve 17 rotates backward, its rotation is no longer transmitted to the brake member 13 by the end of the threads 30, and the friction between the engaged threads of the sleeve 17 and of the brake member 13 is insufficient to overcome the restraining force of the coupling spring which yieldably connects the brake member to the sleeve 18. The brake member 13 is thereby impeded in its rotation while the sleeve 17 rotates backward, and the brake member 13 threadedly moves on the sleeve toward the brake end of the hub until it sufficiently spreads the sleeve for engagement with the hub shell 1.

Back pedaling also shifts the hub between its two speeds by means of the ring 11. The ring normally rotates with the pawl carrier 25 and the pawls 8. In the high speed position of the hub, the pawls 8 extend through the notches 29, and motion is transmitted from the pawls to the ring 11 by a tip portion of each pawl which abuts against an axial edge of the corresponding notch 29 as it evident from FIG. 3. In the low speed position of the hub illustrated in FIG. 4, the afore-mentioned motion transmitting tip portions of the pawls circumferentially abut against the internal radial projection 42 of the ring 11 in the direction of normal forward rotation indicated by the arrows in FIGS. 3 and 4. During forward pedaling, the ring 11 is thus in a fixed circumferential position to the pawl carrier 25.

During back pedaling, the pawls 8 move away from the afore-mentioned axial edges of the notches 29 or the radial projections 42 because of the braking effect of the spring 26 on the ring 11. It will be remembered that the brake member 13 is impeded in its rotation on the shaft 2 during back pedaling, and that the spring 26 is mounted on the brake member. The relative movement of the ring 11 and the pawls 8 during back pedaling is determined by the movement of the brake member 13 on the drive sleeve 17. The pitch of the threads 30 and other dimensional relationships of the hub elements are selected in such a manner that the pawls 8 move relative to the ring 11 during each full axial braking movement through an arc sufficient to move the pawls 8 out of corresponding notches 29 when the hub is in its high speed position, and sufficient to move the pawls 8 away from the projections 42 into the notches 29, but not farther, when the hub originally is in its low speed position. Back pedaling and braking thus results in a speed change of the hub regardless of the initial speed position.

The embodiment of the invention illustrated in FIG. 2 is a bicycle hub similar in outward appearance to the hub shown in FIG. 1. Its hub shell 1, shaft 2, driver member 3, and planetary gearing 4, 5, 6, 7, are identical with those discussed with reference to FIG. 1. Its drive sleeve 17' is closely similar in structure and analogous in function to the corresponding member 17 of the aforedescribed hub. The sleeve 17' carries a pawl carrier 25 equipped with pawls 8 and cooperating with a ratchet 12 on a coupling ring 9, the coupling ring being secured to the hub shell 1 with some lost rotary motion by a ratchet 10 in the same manner as described with reference to FIG. 1 and shown in FIGS. 3 and 4.

The hub illustrated in FIG. 2 lacks a coaster brake. It is still necessary to limit back pedaling to a stroke sufficient to shift the pawls 8 and a control ring 11 between relative positions corresponding to those shown in FIGS. 3 and 4 for shifting between high and low speed. An abutment member 19 engages threads 30 on an external cylindrical portion of the drive sleeve 17', and is threadedly movable on the sleeve between an axially terminal position in which it abuts against an integral flange of the sleeve 17' as shown in FIG. 2, and another terminal position, in which the member 19 engages a fixed annular abutment 21 mounted on the bearing race 16 on which the hub shell 1 is supported.

Relative threaded movement of the abutment member 19 and of the drive sleeve 17' during back pedaling is caused by a coupling spring 22 in a manner known in itself. The coupling spring consists of spring wire which is bent into an open loop tightly wound about a corresponding annular groove in the member 19. An end portion of the spring 22 projects radially from the member 19 and engages an axial slot in the bearing race member 16. The spring is thus permanently secured against rotation about the axis of the shaft 2. During forward pedaling, the friction between the spring 22 and the walls of the groove in the member 19 urges the latter toward the drive end of the hub. During back pedaling, the spring 22 prevents rotation of the abutment member 19, and thus causes threaded movement of the member 19 relative to the drive sleeve 17' until the member 19 engages the annular abutment 21. It will be understood that the brake member 13 is equipped with a coupling spring similar to the spring 22 and operative in an analogous manner.

The abutment member 19 carries two pawls 14 which engage a ratchet 10 on the inner face of the hub shell 1 in the manner described above.

The spring 20 is connected to the abutment member 19 and in friction engagement with the control ring 11. The spring 20 in FIG. 2 has the same function as the spring 26 in the arrangement of FIG. 1.

It is evident that the hub described in the preceeding paragraphs and illustrated in FIG. 2 operates in the same manner as described hereinbefore with reference to the structure shown in FIG. 1. The relationship between the pitch of the threads 30 and the dimensions of the other hub elements will again be selected in such a manner that movement of the abutment member 19 between the position illustrated in FIG. 2 toward a position of engagement with the annular member 21 will cause a movement of the pawls 8 relative to the control ring 11 sufficient for a speed shift from one speed of the hub to the other.

The lost motion between the hub shell 1 and the coupling ring 9 in the embodiment of the invention shown in FIG. 1 prevents blocking of the rear wheel of the bicycle when the bicycle is braked to a standstill, the rider dismounts, and the bicycle is subsequently pushed in a backward direction. No movement is transmitted from the ratchet 12 to the pawls 8 during such backward pushing of the bicycle until the lost motion between the hub shell 1 and the coupling ring 9 is exhausted. Before the projection 27 on the coupling ring can move from a position of abutment against one adjacent tooth of the ratchet 10 into a position against the other adjacent tooth during backward pushing of the bicycle, the pawls 14 engage the ratchet 10, since the circumferential spacing of the ratchet teeth radially aligned with the pawls 14 is smaller than the lost motion of the coupling ring 9. As soon as the pawls 14 engage the ratchet 10, they are rotated backward, and thereby release the brake member 13 from the brake sleeve 18 in the apparatus of FIG. 1, and the member 19 from the annular abutment 21 in the hub of FIG. 2. This arangement safely prevents renewed braking engagement between the member 13 and the sleeve 18 after back pedaling pressure has been relaxed upon dismounting of the rider from the bicycle.

It should be understood, of course, that the foregoing disclosure relates only to preferred embodiments of the invention and that it is intended to cover all changes and modifications of the invention herein chosen for the purpose of the disclosure which do not constitute departures from the spirit and scope of the invention set forth in the appended claims.

What is claimed is:
1. In a multiple speed hub, in combination:
    (a) a stationary shaft, having an axis;
    (b) hub shell means supported on said shaft for rotation about said axis in a forward direction and a backward direction, said hub shell means defining a cavity therein;
    (c) driver means supported on said shaft for rotation about said axis is said directions;
    (d) a multiple speed transmission connected to said driver means for rotation therewith, said transmission including first and second transmission members operatively connected for rotation, said first transmission member rotating at a lower speed than said second transmission member;
    (e) first ratchet coupling means interposed between said first transmission member and said hub shell means, and second ratchet coupling means interposed between said second transmission member and said hub shell means, said first and second ratchet coupling means being mounted in said cavity for selectively transmitting the rotation of said transmission members to said hub shell means when the corresponding tranmsission member rotates in said forward direction at a speed equal to the speed of said hub shell means,
        (1) said second ratchet coupling means including a pawl member and a ratchet member engageable by said pawl member, the members of said second ratchet coupling means being respectively connected to said second transmission member and to said hub shell means;
    (f) a control member mounted in said cavity for rotation about said axis said pawl member being movable relative to said control member between a blocking position in which said control member holds said pawl member out of engagement with said ratchet member, and an unblocking position in which said control member permits engagement of said pawl member with said ratchet member;
    (g) first connecting means interposed between said pawl member and said control member for jointly rotating said control member with said pawl member when said driver means rotates in said forward direction; and
    (h) second connecting means interposed between said shaft and said control member for impeding movement of said control member and thereby shifting said pawl member between said positions thereof when said driver means rotates in said backward direction.

2. In a hub as set forth in claim 1, said control member being formed with an aperture therethrough, said control member being interposed between said pawl member and said ratchet member in the blocking position thereof, and said aperture being aligned with said pawl member in said unblocking position for entry of said pawl member into said recess and engagement of said pawl member with said ratchet member.

3. In a hub as set forth in claim 1, said second connecting means including yieldable coupling means.

4. In a hub as set forth in claim 3, coaster brake means including a brake member, and securing means for securing said brake member against rotation about said axis during said backward movement of said driver, said yieldable coupling means being mounted on said brake member.

5. In a hub as set forth in claim 3, an abutment member axially movable on said shaft toward a predetermined position of abutment responsive to said backward movement of said driver member, and means for securing said abutment member against rotation during said axial movement thereof, said yieldable coupling means being mounted on said abutment member.

6. In a hub as set forth in claim 1, said second coupling means further including a coupling member; lost motion means connecting said coupling member to said hub shell means for joint delayed rotation, said ratchet member being mounted on said coupling member.

7. In a hub as set forth in claim 6, said first coupling means including a ratchet member and a pawl member respectively secured to said hub shell means and to said first transmission member, the ratchet member of said first coupling means having a plurality of teeth spaced for engagement by said pawl member at predetermined intervals, said intervals being shorter than the delay of said lost motion means.

8. In a hub as set forth in claim 1, said first coupling means including a ratchet member and a pawl member, said ratchet member of said first coupling means being mounted on said hub shell means and extending about said axis, said ratchet member of said first coupling means having a plurality of axially elongated circumferentially spaced teeth, the two teeth circumferentially adjacent a selected tooth axially extending beyond said selected tooth and defining a space therebetween, said second coupling means further including a coupling member rotatable about said axis, a radial projection on said coupling member extending into said space for limiting rotation of said coupling member by respective abutment against said two teeth, the ratchet member of said second ratchet coupling means being mounted on said coupling member.

9. In a hub as set forth in claim 1, said first connecting means including engaging means on said pawl member arranged for selectively engaging said control member, when said driver means rotates in said forward direction, and for releasing said control member when said driver means rotates in said backward direction.

10. In a hub as set forth in claim 1, a drive sprocket releasably mounted on said driver means.

References Cited by the Examiner
UNITED STATES PATENTS 3,135,368   6/1964   Shimano _____ 74—781

DAVID J. WILLIAMOWSKY, *Primary Examiner.*

DON A. WAITE, *Examiner.*

M. H. FREEMAN, T. C. PERRY, *Assistant Examiner.*